(12) United States Patent
Worrell (10) Patent No.: US 7,422,236 B2
(45) Date of Patent: Sep. 9, 2008

(54) APPARATUS AND METHOD FOR PROVIDING A HORN CONTACT MECHANISM

(75) Inventor: Barry C. Worrell, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 525 days.

(21) Appl. No.: 11/085,817

(22) Filed: Mar. 21, 2005

(65) Prior Publication Data

US 2006/0208465 A1 Sep. 21, 2006

(51) Int. Cl.
*B60R 21/16* (2006.01)
(52) U.S. Cl. ..................................... 280/731
(58) Field of Classification Search ................. 280/731
See application file for complete search history.

(56) References Cited

U.S. PATENT DOCUMENTS

| | | | | |
|---|---|---|---|---|
| 5,380,037 | A | 1/1995 | Worrell et al. | 280/728 |
| 5,873,596 | A * | 2/1999 | Kantoh et al. | 280/728.2 |
| 5,904,366 | A * | 5/1999 | Nishijima et al. | 280/728.2 |
| 6,092,832 | A | 7/2000 | Worrell et al. | 280/728.2 |
| 6,196,573 | B1 | 3/2001 | Worrell et al. | 280/728.2 |
| 6,237,944 | B1 | 5/2001 | Worrell et al. | 280/731 |
| 6,276,711 | B1 * | 8/2001 | Kurz et al. | 280/728.2 |
| 6,554,312 | B2 * | 4/2003 | Sakane et al. | 280/728.2 |

(Continued)

FOREIGN PATENT DOCUMENTS

DE WO 00/74980 A1 6/2000 ............. 21/20

OTHER PUBLICATIONS

U.S. Appl. No. 10/373,161, filed Feb. 24, 2003 pending.

(Continued)

*Primary Examiner*—Faye M. Fleming
(74) *Attorney, Agent, or Firm*—Douglas D. Fekete (57) ABSTRACT

A method an apparatus for providing a horn switch assembly for securing an inflatable cushion to a steering wheel armature, the horn switch assembly comprising: a backing plate defining a receiving area, the receiving area being configured to receive at least a portion of the inflatable cushion, the receiving area being defined by a peripheral wall of the backing plate; a plurality of mounting members depending outwardly and away from the peripheral wall, the plurality of mounting members providing a mounting surface, wherein the mounting surface of the plurality of mounting members is configured to receive a mounting mechanism therein, wherein each of the plurality of mounting members further comprises a contact point secured thereto; a plurality of isolation mechanisms each being configured to be secured to the steering wheel armature, wherein at least one of the plurality of isolation mechanisms comprises a guide pin and a locking pin for guiding and movably securing one of the mounting mechanisms thereto and each of the plurality of isolation mechanisms comprises a portion of a wire having a non-insulated portion disposed proximate to the contact point of one of the plurality of mounting members; and a biasing member disposed between each of the plurality of isolation mechanisms and a respective one of the plurality of mounting members, wherein the backing plate is capable of movement between a first position and a second position, wherein the contact point of one of the plurality of mounting members makes contact with the non-insulated portion of the pair of wires in the second position providing a conductive path therebetween.

20 Claims, 11 Drawing Sheets

U.S. PATENT DOCUMENTS

| | | | |
|---|---|---|---|
| 6,942,247 B2 * | 9/2005 | Simpson | 280/731 |
| 2002/0011721 A1 * | 1/2002 | Kikuta et al. | 280/731 |
| 2002/0043786 A1 * | 4/2002 | Schutz | 280/728.2 |
| 2003/0184062 A1 * | 10/2003 | Albers et al. | 280/731 |
| 2005/0017484 A1 * | 1/2005 | Worrell et al. | 280/731 |
| 2005/0161308 A1 | 7/2005 | Frisch | 200/61.54 |
| 2006/0175816 A1 * | 8/2006 | Spencer et al. | 280/731 |
| 2006/0208470 A1 * | 9/2006 | Tsujimoto et al. | 280/731 |

OTHER PUBLICATIONS

U.S. Appl. No. 10/797,440, filed Feb. 10, 2003 pending.

* cited by examiner

APPARATUS AND METHOD FOR PROVIDING A HORN CONTACT MECHANISM

TECHNICAL FIELD

The present invention relates to horn contact mechanisms and more particularly the present invention relates to an apparatus and method for providing a horn contact mechanism, which also provides a means for securing an airbag module to a vehicle component.

BACKGROUND

Vehicles are supplied with driver side airbag modules; generally the driver side airbag module is located in the center of the steering wheel. This is also the same location where a horn-activating switch has traditionally been mounted. In addition, other inflatable cushions or airbag modules have been installed in vehicles.

Various mounting mechanisms have been used for securing airbag modules to support structures in a vehicle. Non-limiting examples of such support structures include steering wheels and vehicle instrument panels. In one known mounting mechanism, mounting bolts are passed through openings in the vehicle support structures wherein a threaded portion of the mounting bolts engages a complimentary nut or threaded portion of the airbag module.

Another mechanism for use with a driver side airbag module includes a means for providing a horn activation circuit wherein horn contact members are forced into contact in order to complete a horn activation circuit.

However, current attachment mechanisms for use with driver side airbag modules comprising horn activation circuits comprise numerous parts that require additional installation steps and costs. Therefore, it is desirable to provide an apparatus and method for providing a horn contact mechanism that uses a minimal amount of components and is easy to install and manufacture.

SUMMARY

Exemplary embodiments are directed to a method and apparatus for providing a horn switch assembly for securing an inflatable cushion to a steering wheel armature. In one embodiment, the horn switch assembly comprises: a backing plate defining a receiving area, the receiving area being configured to receive at least a portion of the inflatable cushion, the receiving area being defined by a peripheral wall of the backing plate; a plurality of mounting members depending outwardly and away from the peripheral wall, the plurality of mounting members providing a mounting surface, wherein the mounting surface of the plurality of mounting members is configured to receive a mounting mechanism therein, wherein each of the plurality of mounting members further comprises a contact point secured thereto; a non-conductive isolation mechanisms being configured to be secured to the steering wheel armature, wherein the isolation mechanism comprises at least one guide pin and at least one locking pin for guiding and movably securing the mounting mechanism thereto and the isolation mechanism comprises a portion of a wire having a non-insulated portion disposed proximate to the contact point of one of the plurality of mounting members; and a biasing member disposed between each of the mounting members and the isolation mechanism, wherein the backing plate is capable of movement between a first position and a second position, wherein the contact point of one of the plurality of mounting members makes contact with the non-insulated portion of the pair of wires in the second position providing a conductive path therebetween.

In another exemplary embodiment, a horn switch assembly for securing an airbag module to a steering wheel armature is provided, the horn switch assembly comprising: a plurality of mounting mechanisms each being secured to the steering wheel armature, each mounting mechanism providing a means for securing the airbag module thereto; and a plurality of horn activation switches secured to the mounting mechanisms, each horn activation switch comprising: a housing; a plunger slidably received within the housing, the plunger having an airbag module contact end, a conductive horn circuit activation end, and an annular member disposed therebetweeen; and a biasing spring disposed about the plunger between the annular member and the conductive horn circuit activation end, wherein the biasing member makes contact with an inner flange of the housing; and a pair of wires each having a non-insulated portion disposed proximate the conductive horn circuit activation end, wherein the biasing member maintains the conductive horn circuit activation end in a facing spaced relationship with respect to the non-insulated portion of the pair of wires, and application of a force to the airbag module contact end causes the conductive horn circuit activation end to make contact with the non-insulated portion of the pair of wires and complete a horn activation circuit.

In another exemplary embodiment, a backing plate for mounting an inflatable cushion to a vehicle is provided. The backing plate comprising: a receiving area configured to receive at least a portion of the inflatable cushion, the receiving area being defined by a peripheral wall of the backing plate; and a plurality of mounting members depending outwardly and away from the peripheral wall, the plurality of mounting members providing a mounting surface.

BRIEF DESCRIPTION OF THE DRAWINGS

FIGS. 14A-24 are views of a mounting mechanism and horn activation switch constructed in accordance with alternative exemplary embodiments of the present invention.

DETAILED DESCRIPTION OF EXEMPLARY EMBODIMENTS

Exemplary embodiments of the present invention are directed to an apparatus and method for providing a horn activation mechanism. In addition, exemplary embodiments are directed to horn activation mechanisms configured for use with and/or comprising a portion of the mechanism for attaching the driver side airbag module to the vehicle.

This application is related to U.S. Pat. Nos. 5,380,037; 6,092,832; 6,196,573; 6,237,944; U.S. patent application Ser. No. 10/373,161, filed Feb. 24, 2003; U.S. patent Ser. No. 10/797,440 filed Mar. 10, 2004 and U.S. Provisional Patent Application No. 60/608,595, filed Sep. 4, 2004, the contents each of which are incorporated herein by reference thereto.

In particular, exemplary embodiments of the present invention are directed to an airbag module connection assembly for use with "snap-in" driver side airbag modules and/or floating horns switches and exemplary embodiments are directed to apparatus and methods for limiting the number of components necessary to provide both a horn activation switch and a method or means for securing an airbag module to a steering wheel armature. An exemplary embodiment comprises a backing plate or base plate stamped from a piece of stock material such as steel wherein the backing plate defines a mounting area for a portion of the airbag module and a plurality of mounting members are configured to depend away from the mounting area, wherein the mounting members are configured for securement to the steering wheel.

Figures 1, 2:
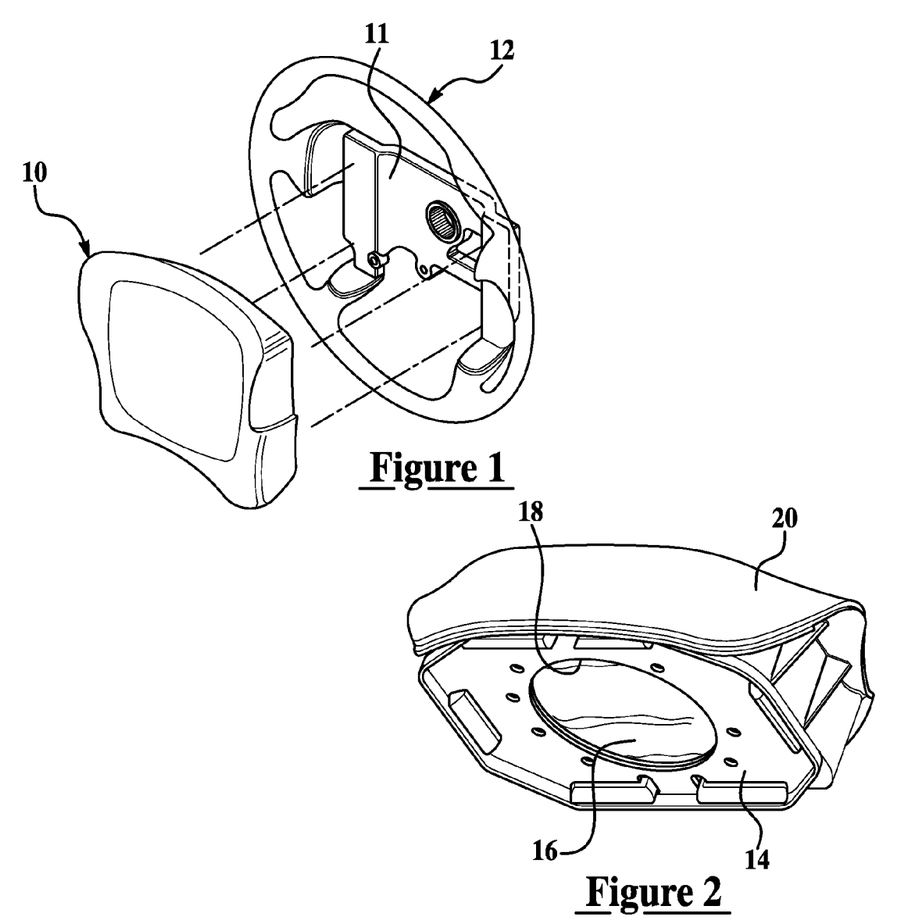
FIG. 1 is a perspective view of an airbag module and a steering wheel configured to receive the airbag module.
FIG. 2 is a perspective view of an airbag module.

Referring now to FIGS. 1 and 2, a driver side airbag module 10 is illustrated. Driver side airbag module 10 is typically mounted to a hub or armature 11 of a steering wheel 12. Typically, some form of mounting mechanism is provided to mount the airbag module to the steering wheel. As will be disclosed herein exemplary embodiments of the present invention are directed to mounting mechanisms for mounting the airbag module to the steering wheel as well as providing a horn activation circuit wherein the cost and complexity of the same is reduced. Generally, airbag modules include a base plate or backing plate 14 configured for receiving and engaging an inflatable cushion 16 and an inflator each of which is secured to the backing plate, which is then secured to the steering wheel. Although a driver side airbag module is illustrated, alternative exemplary embodiments of the present invention, without horn activation circuits are not intended to be limited to be used solely with driver side airbag modules. Other non-limiting uses include mounting mechanisms for side airbag modules, roof rail airbags and passenger airbags.

Generally, and referring now to driver side airbag modules, the backing plate will include a central opening 18 configured for receiving a portion of the inflator therein. As is known in the related arts, the inflatable cushion is constructed out of a material configured for inflation upon receipt of an inflation gas from the inflator when certain predetermined vehicle conditions are sensed. The inflatable cushion is normally folded and covered by a plastic cover 20, which preferably has an outer soft pad. As is known in the related arts the cover may be secured to the backing plate in any suitable manner, such as by cover tabs snapped over indented portions in the backing plate, as best shown in FIG. 2. In addition, the cover preferably includes tear lines or weakened portions that permit the cover to open during inflation of the inflatable cushion.

Figure 3:
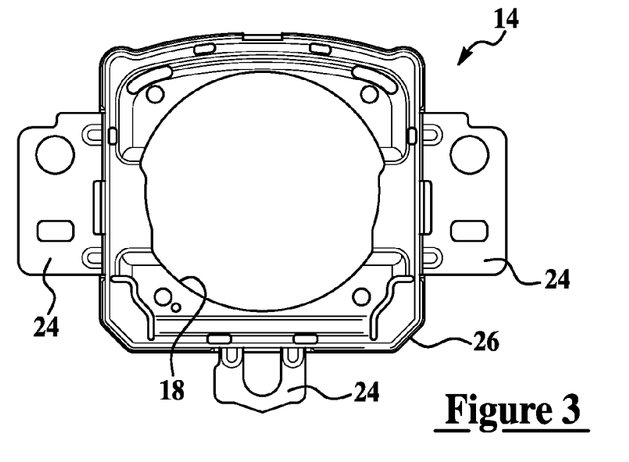
FIG. 3 is a top plan view of a base plate or backing plate constructed in accordance with an exemplary embodiment of the present invention.
Figure 4:
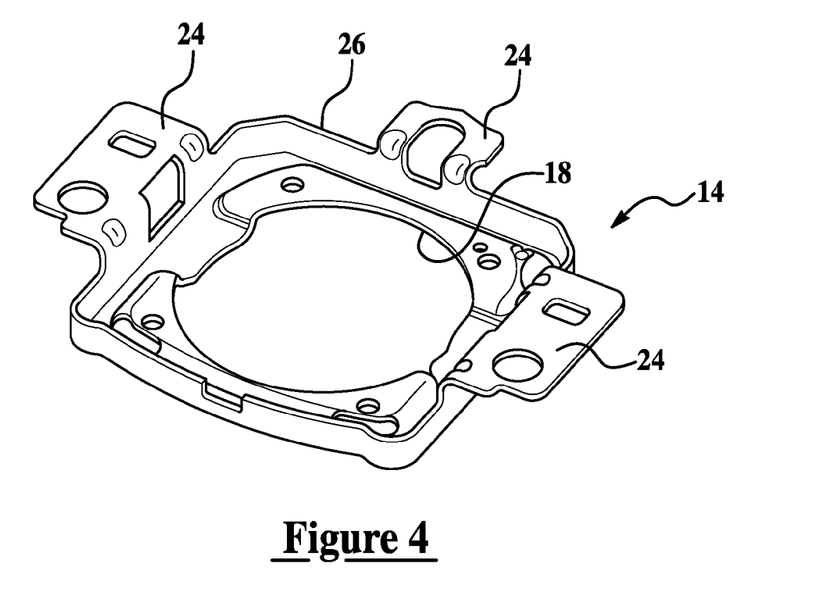
FIG. 4 is a perspective view of a base plate or backing plate constructed in accordance with an exemplary embodiment of the present invention.
Figure 5:
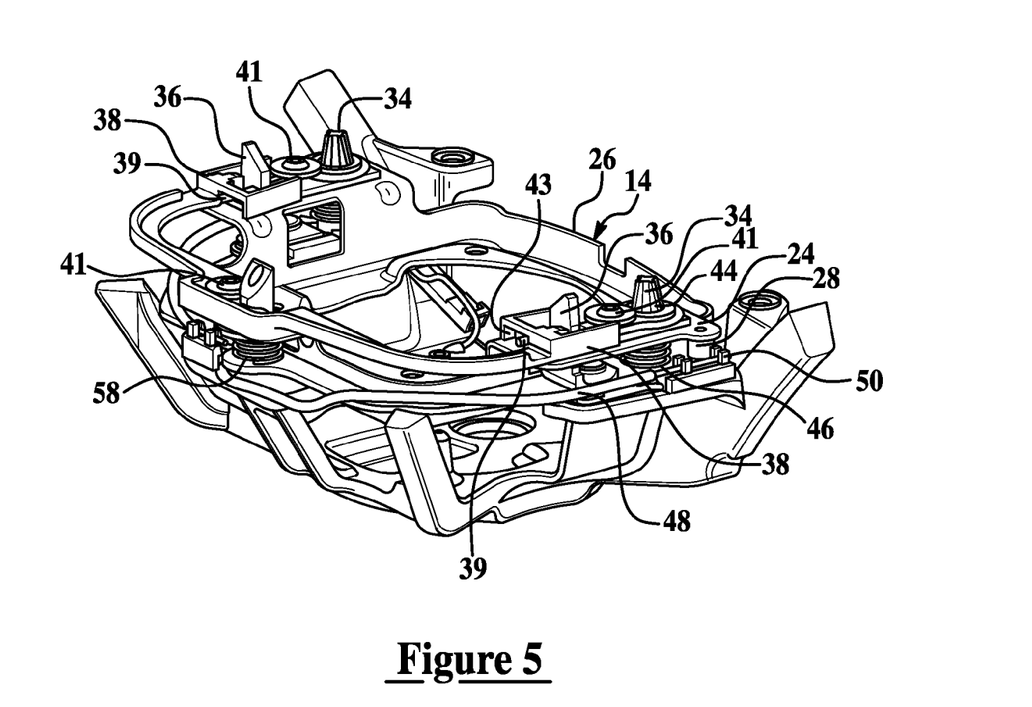
FIG. 5 is a perspective view of a base plate or backing plate constructed in accordance with an exemplary embodiment of the present invention secured to a steering wheel armature.

Referring now to FIGS. 3-8, exemplary embodiments of the present invention are illustrated. FIGS. 3 and 4 illustrate backing plate 14 wherein the backing plate is configured to define a receiving area 22 for receiving a portion of component parts of the airbag module (e.g., inflator, inflatable cushion, retainer ring, etc.) and a plurality of mounting flanges 24, which depend away from a periphery 26 of the receiving area. In accordance with an exemplary embodiment three mounting flanges depend away from periphery 26, two at either side of the receiving area and one located between the other two. This configuration provides stability to the mounting of the airbag module to the armature as it moves between horn activating and non-horn activating positions. Of course, it is understood that any number of mounting flanges are contemplated to be within the scope of the present invention. As will be discussed herein mounting flange or mounting member 24 provides a surface area for mounting the airbag module to the steering wheel. In addition, the mounting flanges are provided with apertures for facilitating the securement of the base plate to the steering wheel armature.

Referring now to FIGS. 5-8 and in accordance with one exemplary embodiment, the securement of backing plate 14 to the steering wheel armature is illustrated. In accordance with an exemplary embodiment the backing plate is movably secured to the steering wheel armature wherein an applied force to the airbag module will cause the backing plate to move from a facing spaced relationship towards the steering wheel armature. In addition, FIGS. 5-8 also illustrate the features of the horn activation mechanism or switch. As illustrated, each mounting flange has a contact point 28 secured thereto. In accordance with an exemplary embodiment contact point 28 comprises an electrically conductive material which will close or complete a circuit of a horn activation mechanism when the backing plate is moved toward the armature from a first position to a second position, wherein the contact point will complete the horn activation circuit and activate the horn. A non-limiting example of an embodiment of contact point 28 is a copper rivet. In addition, and in this embodiment backing plate 14 is also formed out of a conductive material, which is provided with an electrical current thus contact point 28 is provided with a current or a conductive path to complete a circuit or close a horn activation switch when contact point 28 makes contact with another portion of the horn activation circuit. A non-limiting example of the conductive material for backing plate 14 is steel.

As illustrated in FIGS. 5-8, a non-conductive isolation mounting mechanism 30 is secured to the armature. The non-conductive isolation mounting mechanism comprises guide pins 34 and locking pins 36 integrally molded therein. The locking pins are configured to engage a locking pin proximate to an opening in a mounting feature or mounting mechanism 38, which is secured to the mounting flanges by snapping or securing the same into at least one opening in at least one mounting flange. In an exemplary embodiment, mounting mechanism 38 and isolation mounting mechanism 30 comprise a non-conductive material, such as plastic, which is easily molded into the configurations illustrated in the attached figures. Also, and as illustrated mounting mechanism 38 and non-conductive isolation mounting mechanism 30 each comprise a single unitary structure having a "U" shaped configuration. Of course, other configurations are contemplated to be within the scope of the present invention. Thus, mounting features or mounting mechanism 38 and non-conductive isolation mounting mechanisms 30 provide a non-conductive securement between steering wheel armature 11 and base plate 14. In order to secure locking pins 36 to the backing plate locking spring members 39 are secured to the mounting feature via bolts or rivet 41, wherein locking spring member 39 is positioned to engage an opening or slot in the locking pin. The locking springs are positioned and configured to be biased into a locking configuration wherein the airbag module is prevented from being completely removed from the steering wheel armature unless the locking spring is urged into a non-locking position by a tool such as a screwdriver blade wherein the locking spring is no longer engaged in the opening of the locking pin, thereby allowing removal of the airbag module from the steering wheel armature. In addition, rivets, bolts or fastener 41 may be used to secure mounting mechanism 30 to the mounting members 24.

In addition, the insulator is also configured to have an opening or slots 43 in a sidewall to allow for biasing of the locking spring into the non-engagement position. Accordingly, the locking pins are configured to engage a portion of the locking spring, which provides a means for securing the airbag module to the steering wheel armature.

Figure 12:
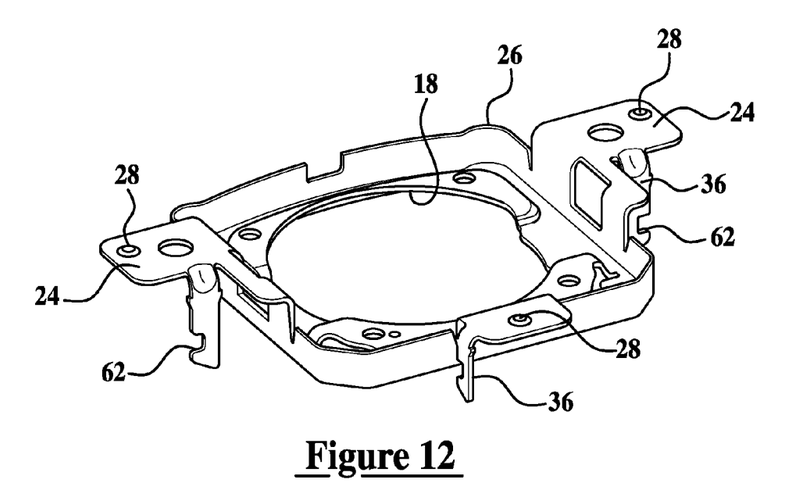
FIG. 12 is a perspective view of a base plate or backing plate constructed in accordance with an alternative exemplary embodiment of the present invention.
Figure 13:
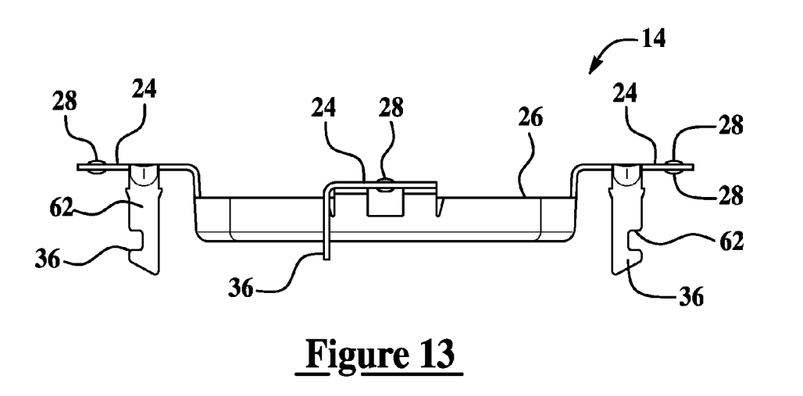
FIG. 13 is a side view of a base plate or backing plate constructed in accordance with an alternative exemplary embodiment of the present invention.

Locking pins 36 comprises an opening (illustrated in FIG. 12 as item 62) for engaging the spring member disposed proximate to an opening in feature 38. The opening of the locking pin is configured to have a height or width large enough to allow movement of the backing plate to and from the armature while preventing disengagement of the locking pin from the opening in the mounting feature.

In addition, guide pins 36 are configured to have a partial frustoconical shape for slidably engaging openings 44 of mounting feature 38. Disposed about the guide pins and between the mounting members are biasing springs 46. The biasing springs are under compression after locking pin 36 engages the locking member disposed proximate to the opening in the mounting feature. Thus, biasing springs 46 provide a biasing force for maintaining the backing plate in a facing spaced relationship with the steering wheel armature.

Figure 6:
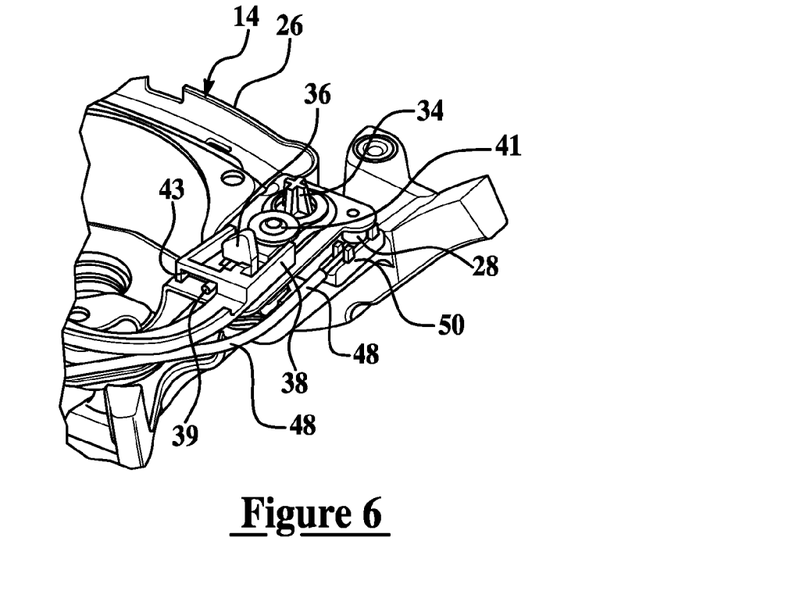
FIGS. 6-8 are partial perspective views of a base plate or backing plate and isolation mechanism constructed in accordance with an exemplary embodiment of the present invention.
Figure 7:
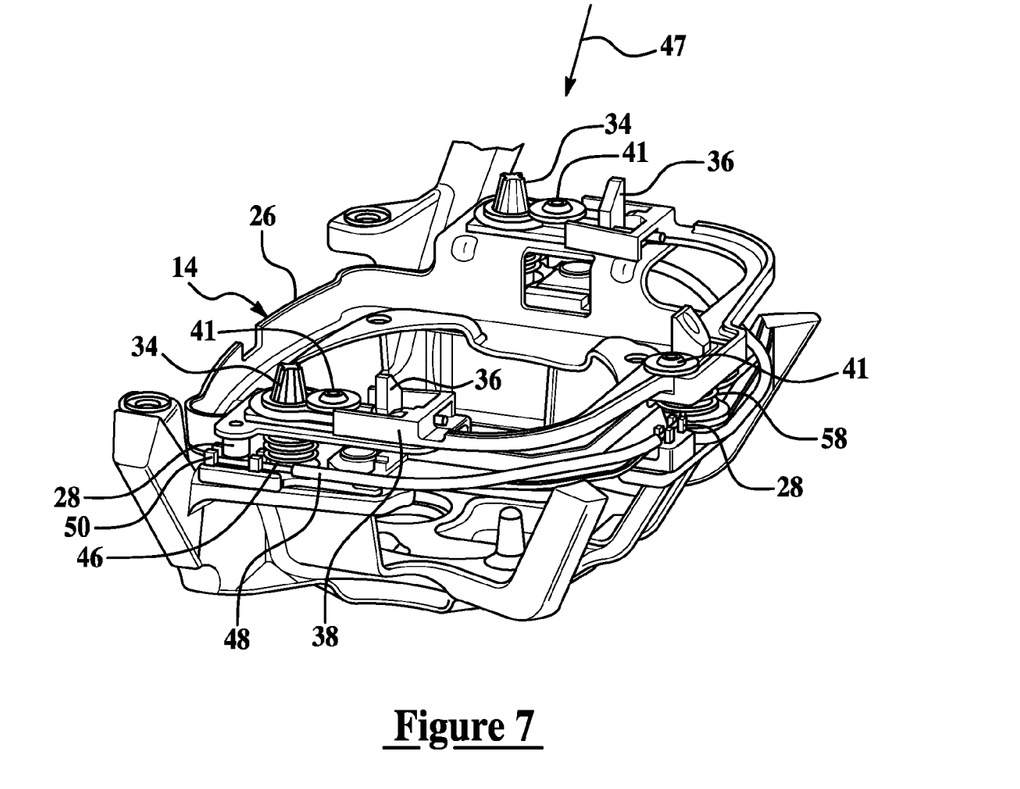

Thus, and as a force is applied to the airbag module generally in the direction of arrow 47, the mounting flanges are able to move towards the non-conductive isolation mechanisms wherein contact point 28 is able to contact a wire 48 disposed in a wire mounting feature 50 of non-conductive isolation mounting mechanism 30. As illustrated in FIG. 6, a single wire may be positioned to have non-insulated portions located proximate to the backing plate. Once the contact point touches the wire a circuit of the horn activation system is completed and the horn is activated. In other words, contact point 28 comprises an electrically conductive material allowing a current to flow from the wire through the electrically conductive member of the backing plate, which is either connected to a ground or a power supply via another wire thus, completing a circuit wherein the completion of the circuit will cause the horn sound. Once the force is removed the biasing force of the biasing spring will return the backing plate and mounting members in a facing spaced relationship wherein the contact point will no longer complete the horn activation circuit. It is also noted in this embodiment that the armature is also configured to allow for the movement of the backing plate to and from the armature.

As illustrated in FIGS. 3-8, portions of the mounting mechanism are formed and located on the backing plate while complementary features are secured to the armature in order to provide a mounting mechanism and a horn switch, wherein the complexity and number of components are reduced thus providing a more efficient means for securing the airbag module to the armature while also providing a horn activation circuit. In addition, the lead to the non-conductive isolation mounting mechanism is isolated from the armature by the non-conductive material of the mounting mechanism thereby preventing the same from inadvertently completing the horn activation circuit. Moreover, the configuration of the mounting member and the horn activation switch allows the number of parts to be reduced thus decreasing the costs and complexity associated with the mounting mechanism and horn activation switch.

Figure 8:
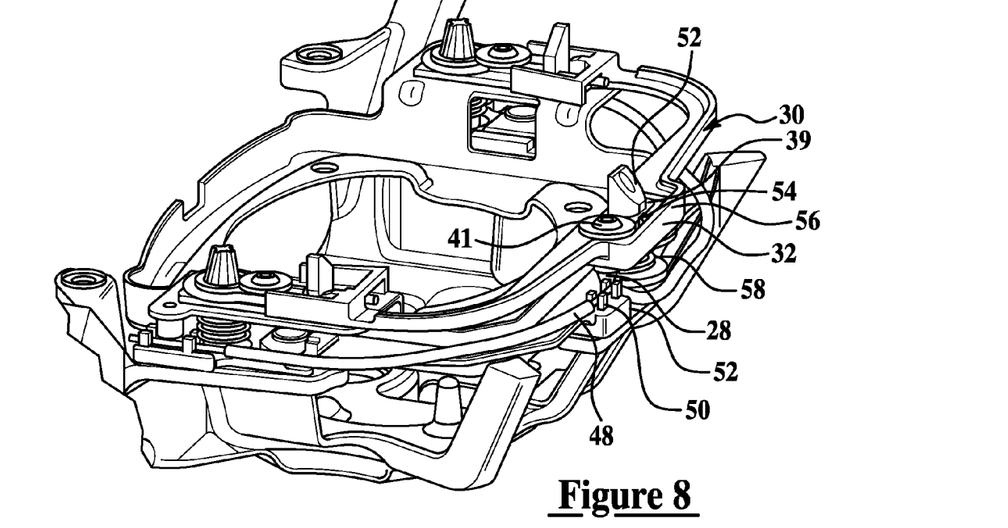
Figure 9:
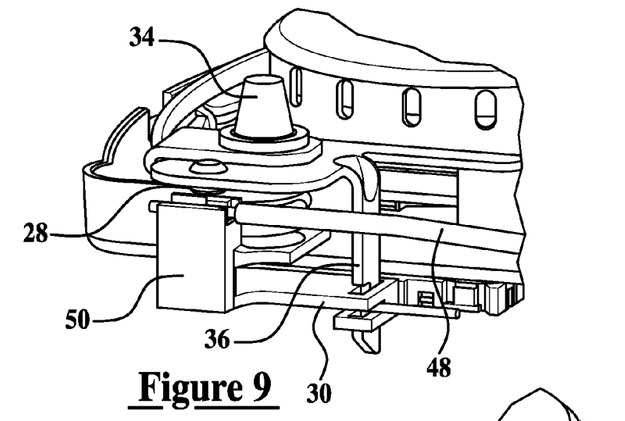
FIGS. 9-11 are partial perspective views of a base plate or backing plate and isolation mechanism constructed in accordance with an alternative exemplary embodiment of the present invention.
Figure 10:
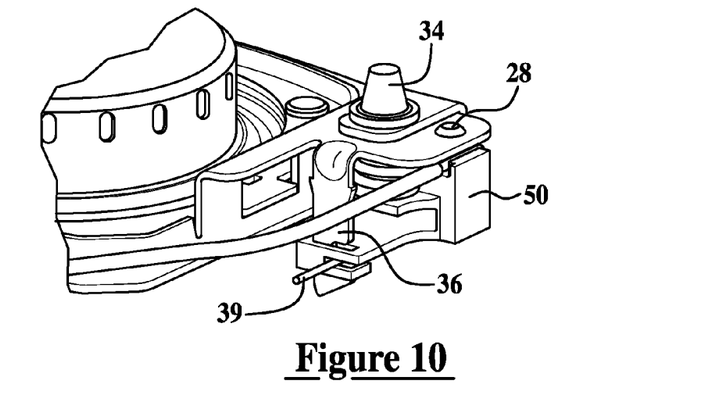
Figure 11:
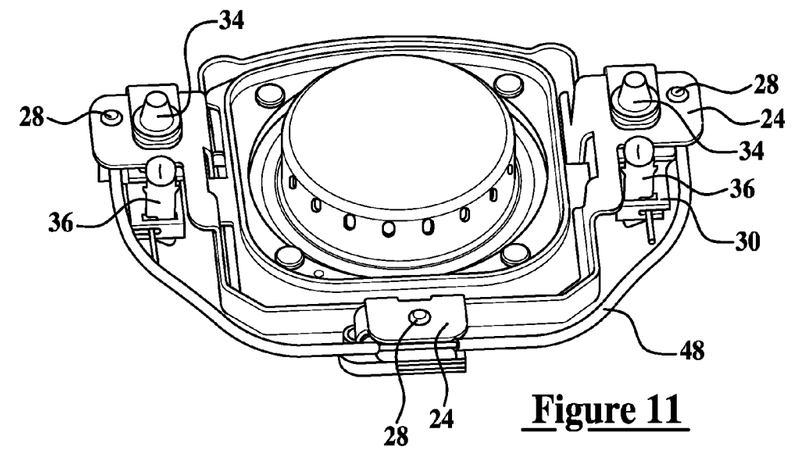

Referring now to FIG. 8, a middle mount portion 32 of the non-conductive isolation mounting mechanism is illustrated. Here a snap in pin 52 is configured to engage a locking pin 39 disposed proximate to an opening 54 in a mounting feature 56 of mounting mechanism 30, which is mounted to mounting member 24. Snap in pin 52 is configured to provide both features of locking pin 36 and guide pin 34, wherein a biasing spring 58 is disposed about snap in pin 52. Again, a wire 48 is disposed in a wire-mounting feature 50, wherein the horn activation circuit is completed as contact portion 28 makes contact with any one of the un-insulated portion of the wire located proximate to the contact point 28. In accordance with an exemplary embodiment, it is noted that the horn activation circuit is configured to activate the horn once one of the contact portions makes contact with an un-insulated portion of the wire. A non-limiting location of the middle mount non-conductive isolation mounting mechanism is at a six o'clock position on the steering wheel.

In an alternative exemplary embodiment a pair of non-conductive isolation mounting mechanisms 30 and a middle mount non-conductive isolation mounting mechanism 32 are each separately secured to the armature. Referring to the pair of non-conductive isolation mounting mechanisms 30, each non-conductive isolation mounting mechanism comprises a guide pin 34 and a locking pin 36 integrally molded therein. Locking pin 36 is configured to engage a locking member proximate to an opening in a separate mounting feature or mounting mechanism 38, which is secured to each mounting flange by snapping into at least one opening in the mounting flange. In an exemplary embodiment, mounting mechanism 38 comprises a non-conductive material, such as plastic. Thus, mounting features or mounting mechanisms 38 and non-conductive isolation mounting mechanisms 30 and 32 provide a non-conductive securement between steering wheel armature 11 and base plate 14. Accordingly, and in this embodiment three separate non-conductive isolation mounting mechanisms and three mounting mechanisms 38 are provided to secure locking pins to the backing plate, wherein the middle mount non-conductive isolation mounting mechanism has a snap in pin configured to provide both features of the locking pin and the guide pin 34. Again, a wire 48 is disposed in wire-mounting features 50, wherein the horn activation circuit is completed as contact portion 28 makes contact with any one of the un-insulated portions of the wire located proximate to the contact point 28. In accordance with an exemplary embodiment, it is noted that the horn activation circuit is configured to activate the horn once one of the contact portions makes contact with an un-insulated portion of the wire.

Referring now to FIGS. 9-13 an alternative exemplary embodiment of the present invention is illustrated. Here backing plate 14 is configured to have the locking pins stamped from the material comprising mounting flanges or mounting portions 24 and separate non-conductive isolation mounting mechanisms 30 and 32 are configured to have an opening 60 with a locking member 39 for engaging an engagement opening 62 of the locking pins. In addition, mounting mechanisms 38 may also be disposed on the mounting flanges to slidably receive the guide pins. In this embodiment, the locking pins are stamped from the stock material used for backing plate 14 at the same time the backing plate 14 is formed by a stamping process. Accordingly, the die or tool used during the manufacturing process of backing plate 14 is configured to both define backing plate 14 as well as the locking pins. In this embodiment operation of the horn activation switch or circuit is similar to the previous embodiments wherein the backing plate is applied with a current via wire and the circuit is complete or the switch is closed when the contact point makes contact with the non-insulated portion of wire 48.

Referring now to FIGS. 14A-22, other alternative exemplary embodiments of the present invention are illustrated. Here, a horn activation switch 64 is mounted proximate to a mounting mechanism 68. Switch 64 is secured to mounting mechanism 68 by a reinforcement plate 70. A non-limiting example of the material contemplated for reinforcement plate 70 is steel. Switch 64 comprises a housing 72 configured to slidably receive a plunger 74 therein. Plunger 74 is configured to have an airbag module contact portion 76, a horn switch contact portion 78 and an annular member 80 disposed therebetweeen. Annular member 80 and plunger 74 are configured to locate a biasing member 82 between annular member 80 and a bottom portion 84 of housing 72. Accordingly, plunger 74 is capable of movement between a non-horn activation position to a horn activation position wherein biasing member 82 is compressed. Therefore, once an actuating force is removed the biasing spring will move the airbag module and contact portion 76 away from a horn activating position.

Figures 14A, 14B:
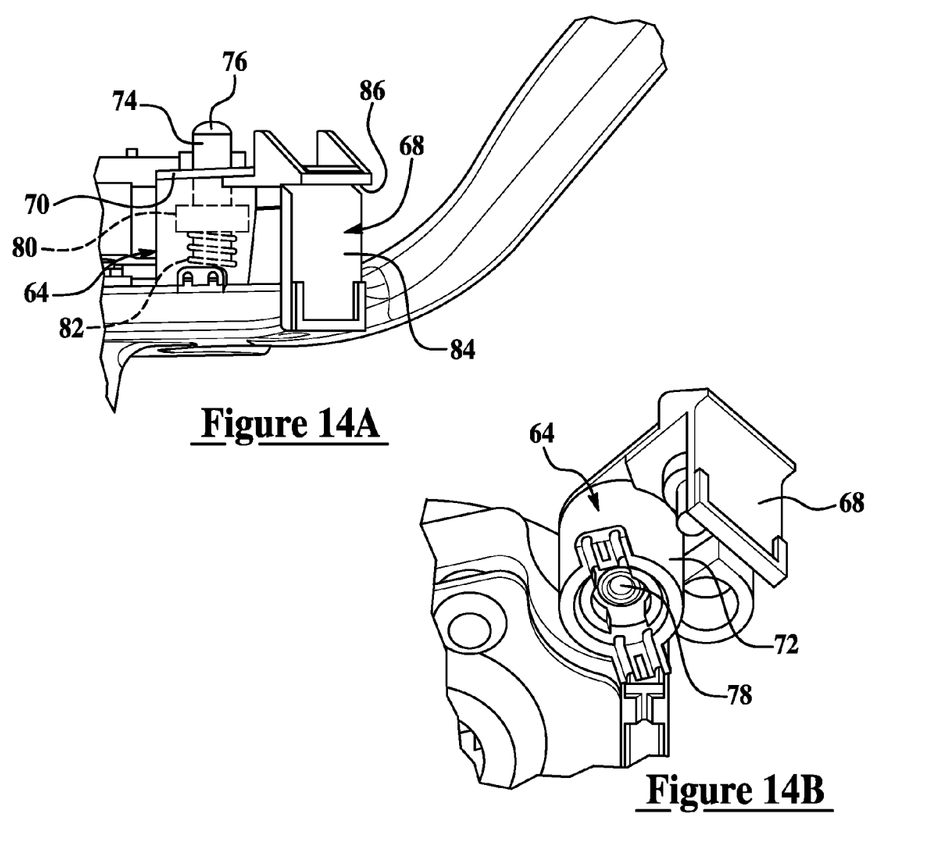

In one embodiment, and as illustrated in FIGS. 14A and 14B, a portion 84 of mounting mechanism 68 is configured to have a shoulder portion 86 configured for engaging a mounting member of a backing plate of an airbag module. In addition, portion 84 is configured to extend past the steering wheel armature as well as provide a channel or receiving area 90. Channel 90 is configured to allow a tool such as a screwdriver to be inserted therein to pry the mounting member away from shoulder portion 86 thereby allowing airbag module to be disengaged from the mounting mechanism. Alternatively, mounting mechanism 68 can be configured to include a feature that is engaged by a locking member and aperture disposed on the backing plate.

Figure 15:
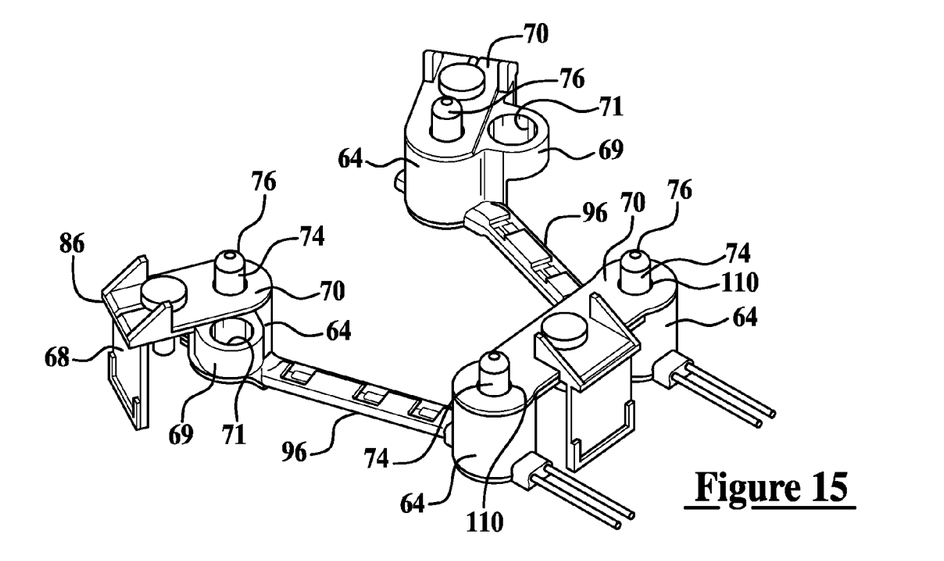

Referring now to FIG. 15, an alternative arrangement of the mounting mechanism of FIGS. 14A and 14B is illustrated. Here a plurality of horn activation switches are configured for use with a plurality of horn mounting mechanisms 68. As illustrated in FIG. 15 horn activation switches are configured to be secured to a single mounting mechanism wherein the other two horn activation switches are secured to separate mounting mechanisms. In this embodiment, a pair of conduits 96 are provided. Each conduit 96 provides a passage for a pair of wires 48, wherein an un-insulated portion of the pair of wires is disposed within the lower portion of the housing such that contact portions 78 of plungers 74 complete the horn activation circuit.

Figure 16:
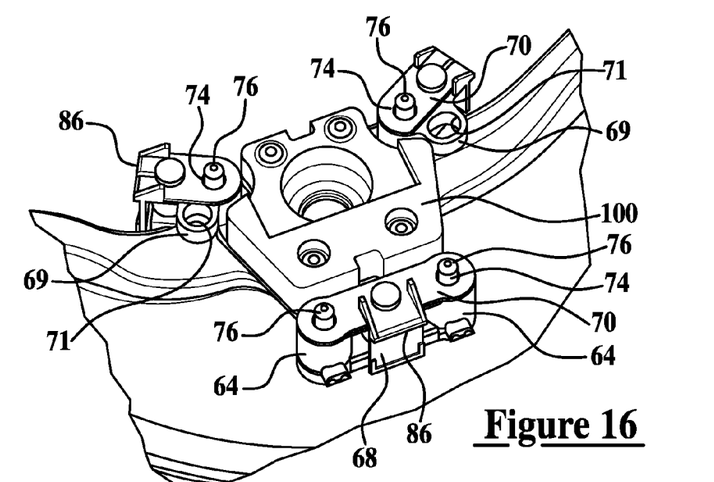

FIG. 16 illustrates yet another exemplary embodiment wherein the mounting mechanism and horn activation switch of the FIG. 15 embodiment is associated with a mass damper 100 movably secured to the steering wheel armature. Mass damper 100 will be secured to the steering wheel via a biasing member tuned to a specific frequency in order to cancel out unwanted vibrations in the steering wheel. In addition, some of the mounting members are configured to have guide portions 69 with guide openings 71 associated thereto. Openings 71 are configured to receive and engage datum locators 73 of a flange or a base plate 75 of an inflator 77. Accordingly, the openings of the guide portions are configured to limit the X and Y movement of the inflator as taught by U.S. patent application Ser. No. 10/373,161, filed Feb. 24, 2003, the contents of which are incorporated herein by reference thereto.

Figure 17:
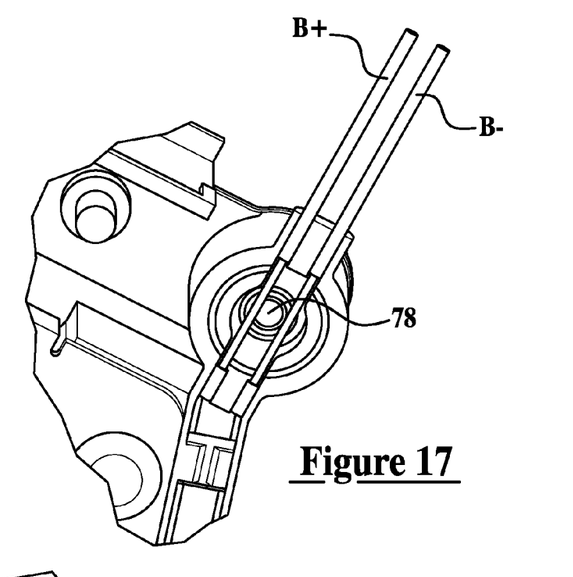

FIG. 17 illustrates the pair of wires and their un-insulated portions as viewed from the bottom of the housing of the horn activation switch. As illustrated, contact point 78 is configured to make contact with each of the un-insulated portions of the pair of wires so as to complete the horn activation circuit as the airbag module is depressed towards the steering wheel armature and the plungers are depressed and the contact point allows a horn activation circuit to be completed.

Figure 18:
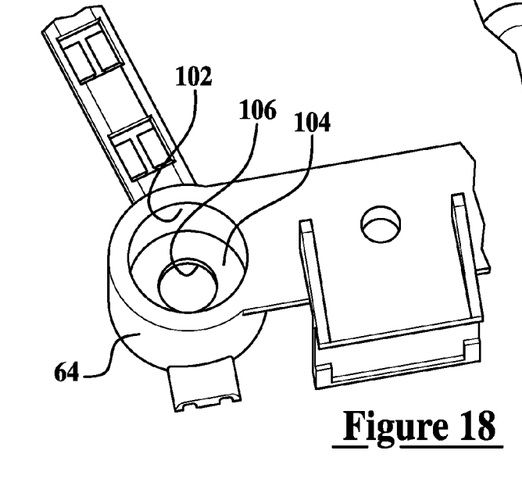

FIG. 18 is a top perspective view of housing 64 wherein an inner opening 102 is illustrated. Inner opening 102 is configured to receive plunger 74 therein. Opening 102 comprises a flange portion 104 defining an inner opening 106. Inner opening 106 is configured to allow a lower contact portion of the plunger to be slidably received therein. Flange portion 104 provides a surface for contacting with the biasing member or spring 82 configured to be disposed about to the lower portion of the plunger between annular portion 80 wherein spring 82 provides a biasing forced to plunger 74 via annular portion 80 and flange portion 104. In addition, flange portion 104 prevents the biasing member or spring from making contact with the un-insulated portions of the wires disposed in housing 64 thus preventing inadvertent activation of the horn circuit. In the illustrated embodiment, and as shown in FIGS. 15-18, the mounting plate 70 provides a means for retaining plunger 74 in opening 102 as well as comprising an opening 110 configured to allow a portion of plunger 74 to slide therethrough thus making contact with the backing plate of the airbag module.

Figures 19, 20, 21, 22:
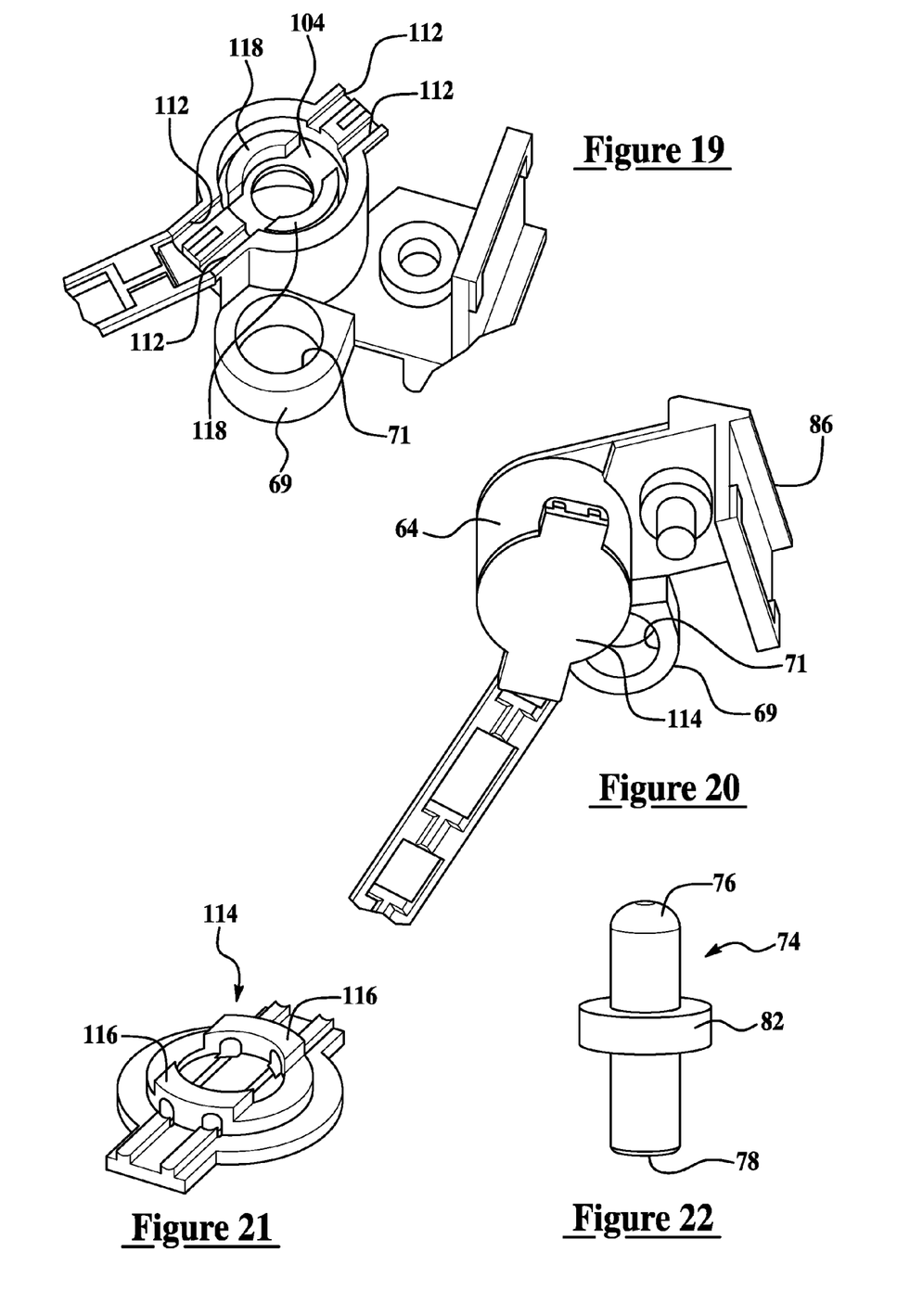
Figure 23:
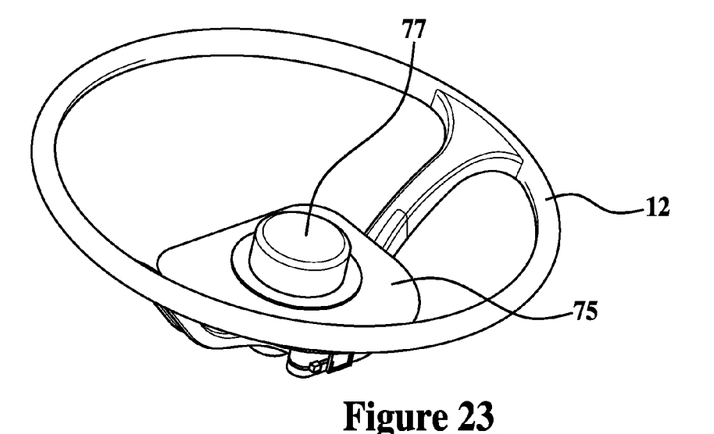
Figure 24:
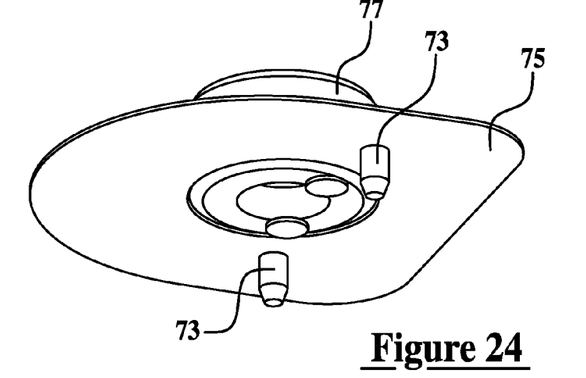

FIG. 19 illustrates a bottom view of housing 64 wherein conduit openings 112 are defined partially by housing 64 and a lower housing mounting member 114. Lower housing mounting member 114 is configured to have a pair of features 116 configured to be received within openings defined by a complementary pair of features 118 of housing 64. Accordingly, and when lower housing mounting member 114 is secured to housing 64, a pair of openings is provided for insertion of wires therein. As illustrated in FIG. 17, an un-insulated portion of the wires is received in the lower portion of the housing, wherein the contact point of the plunger is able to make contact and complete the horn activation circuit.

Figure 25:
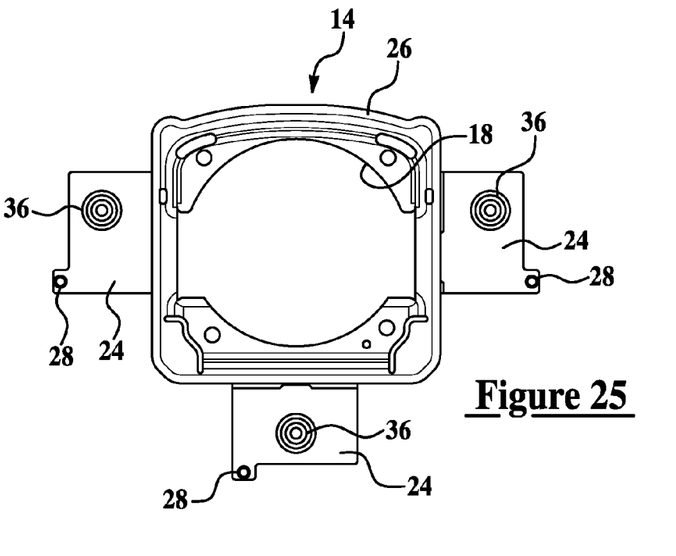
FIGS. 25-29 are views of a mounting mechanism and horn activation switch constructed in accordance with other alternative exemplary embodiments of the present invention.
Figure 26:
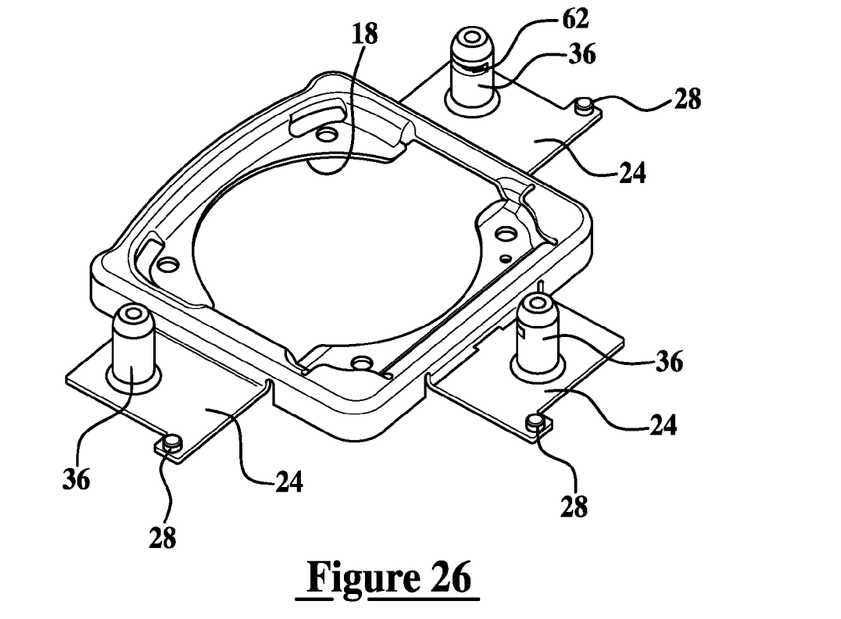

FIG. 25-26 illustrate yet another alternative exemplary embodiment of the present invention wherein the mounting portions of the backing plate comprise integral locking pins 36.

Figure 27:
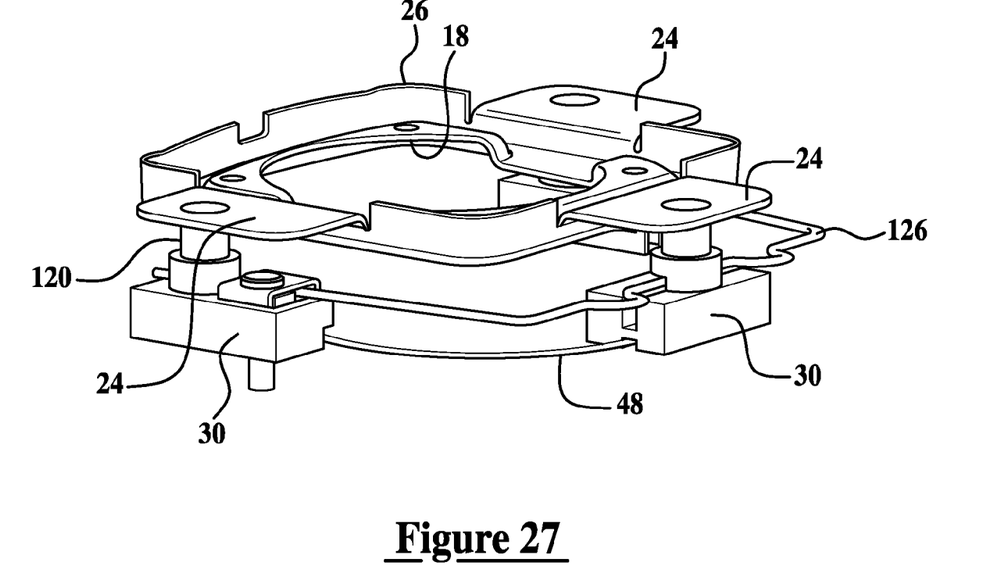
Figure 28:
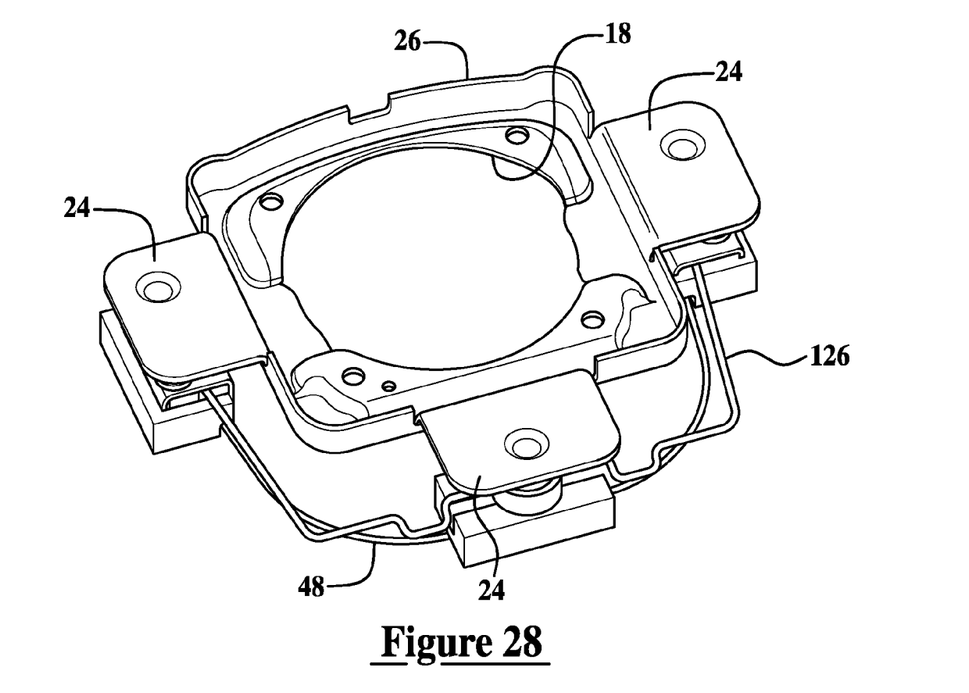
Figure 29:
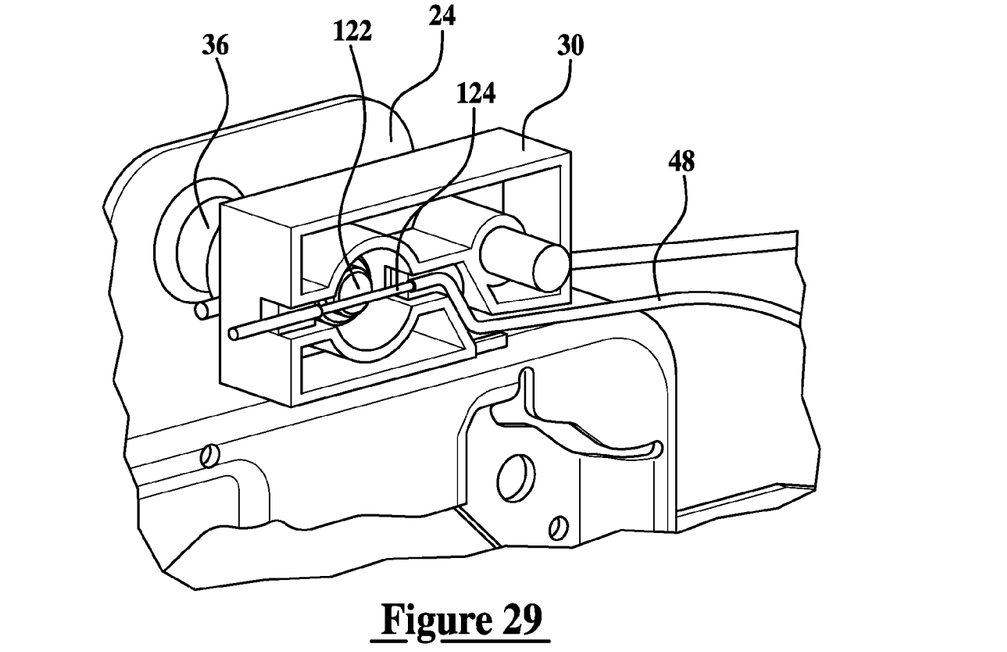

FIGS. 27-29 illustrate yet another alternative exemplary embodiment wherein the backing plate comprises integral locking pins 36, which are configured to be received within an opening 120 of a mounting member 30 and each locking pin 36 provides a guiding feature, a locking feature via opening 62 and a horn switch feature via a conductive tip portion 122 which makes contact with an un-insulated portion 124 of a wire 48 as the backing plate moves towards the mounting members. As illustrated, openings 62 engage a retaining member 126 configured and positioned to engage openings 62.

This embodiment reduces the stack tolerance of the airbag module through the incorporation of a horn contact mechanism into the attachment features of the airbag module. The backing plate of these embodiments may be constructed in accordance with the disclosure and teachings of U.S. provisional patent application Ser. No. 60/608,595, filed Sep. 10, 2004, the contents of which are incorporated herein by reference thereto.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A backing plate for mounting an inflatable cushion to a steering wheel armature, said steering wheel armature comprising locking pins, the backing plate comprising:
   a peripheral wall defining a receiving area configured to receive at least a portion of the inflatable cushion; and
   a plurality of mounting members depending outwardly and away from the peripheral wall, the plurality of mounting members providing a mounting surface for securing the backing plate to the said steering wheel armature, wherein each said mounting member comprises an aperture to slidably receive one of said locking pins; and
   a plurality of a mounting mechanisms, each said mounting mechanism being disposed on said mounting member adjacent the aperture and comprising a locking spring adapted to engage a slot of the locking pin.

2. The backing plate as in claim 1, wherein the mounting mechanism is constructed out of a non-conductive material.

3. The backing plate as in claim 1, wherein each of the plurality of mounting members further comprises a contact point secured thereto, wherein the contact point is configured to close a switch of a horn activation circuit.

4. The backing plate as in claim 1, wherein the backing plate comprises three mounting members, two of which are disposed at opposite sides of the receiving area and the remaining one is located on a side of the receiving area disposed between the other two mounting members.

5. A horn switch assembly for securing an inflatable cushion to a steering wheel armature, the horn switch assembly comprising:
   a backing plate defining a receiving area, the receiving area being configured to receive at least a portion of the inflatable cushion, the receiving area being defined by a peripheral wall of the backing plate;
   a plurality of mounting members depending outwardly and away from the peripheral wall, the plurality of mounting members providing a mounting surface, wherein the mounting surface of the plurality of mounting members is configured to receive a mounting mechanism therein, wherein each of the plurality of mounting members further comprises a contact point secured thereto;
   a plurality of non-conductive isolation mechanisms each being configured to be secured to the steering wheel armature, wherein each of the plurality of isolation mechanisms comprises a structure for guiding and movably securing one of the mounting mechanisms thereto and at least one of the plurality of isolation mechanisms comprises a wire having a non-insulated portion disposed proximate to the contact point of one of the plurality of mounting members; and a biasing member disposed between each of the plurality of isolation mechanisms and a respective one of the plurality of mounting members, wherein the backing plate is capable of movement between a first position and a second position, wherein the contact point of one of the plurality of mounting members makes contact with the non-insulated portion of the wire when the backing plate is in the second position thereby providing a conductive path therebetween.

6. The horn switch assembly as in claim 5, wherein the mounting mechanism is configured to slidably receive a portion of a guide pin mounted to the isolation mechanisms.

7. The horn switch assembly as in claim 5, wherein the contact point is a copper rivet.

8. The horn switch assembly as in claim 5, wherein each of the plurality of mounting surfaces are configured to have an integral locking pin configured to secure the backing plate to the steering wheel armature, wherein the integral locking pin depends downwardly away from the mounting surface.

9. A horn switch assembly for securing an inflatable cushion to a steering wheel armature, the horn switch assembly comprising:
   a backing plate defining a receiving area, the receiving area being configured to receive at least a portion of the inflatable cushion, the receiving area being defined by a peripheral wall of the backing plate;
   a plurality of mounting members depending outwardly and away from the peripheral wall, the plurality of mounting members providing a mounting surface, wherein the mounting surface of the plurality of mounting members is configured to receive a mounting mechanism therein, wherein each of the plurality of mounting members further comprises a contact point secured thereto;
   a non-conductive isolation mechanism being configured to be secured to the steering wheel armature, wherein the isolation mechanism comprises at least one guide pin and at least one locking pin for guiding and movably securing the mounting mechanism thereto and the isolation mechanism comprises a portion of a wire having a non-insulated portion disposed proximate to the contact point of one of the plurality of mounting members; and
   a biasing member disposed between each of the mounting members and the isolation mechanism, wherein the backing plate is capable of movement between a first position and a second position, wherein the contact point of one of the plurality of mounting members makes contact with the non-insulated portion of the pair of wires in the second position providing a conductive path therebetween.

10. The horn switch assembly as in claim 9, wherein the mounting mechanism further comprises a locking spring configured and positioned to engage a slot in the locking pin.

11. The horn switch assembly as in claim 9, wherein the backing plate is constructed out of a conductive material and is supplied with an electrical current.

12. The horn switch assembly as in claim 9, wherein the isolation mechanisms is formed out of a non-conductive plastic material and the locking pin is integrally molded therein and the isolation mechanism is "U" shaped and the mounting mechanism is "U" shaped.

13. The horn switch assembly as in claim 9, wherein at least one of the plurality of isolation mechanisms comprises a single mounting feature providing a means for guiding and movably securing one of the mounting mechanisms thereto.

14. A horn switch assembly for securing an airbag module to a steering wheel armature, the horn switch assembly comprising:
   a plurality of mounting mechanisms each being secured to the steering wheel armature, each mounting mechanism being configured to secure the airbag module thereto; and
   a plurality of horn activation switches secured to the mounting mechanisms, each horn activation switch comprising:

a housing;

a plunger slidably received within the housing, the plunger having an airbag module contact end, a conductive horn circuit activation end, and an annular member disposed therebetweeen; and a biasing spring disposed about the plunger between the annular member and the conductive horn circuit activation end, wherein the biasing member makes contact with an inner flange of the housing; and a pair of wires each having a non-insulated portion disposed proximate the conductive horn circuit activation end, wherein the biasing member maintains the conductive horn circuit activation end in a facing spaced relationship with respect to the non-insulated portion of the pair of wires, and application of a force to the airbag module contact end causes the conductive horn circuit activation end to make contact with the non-insulated portion of the pair of wires and complete a horn activation circuit.

15. The horn switch assembly as in claim 14, wherein each of the plurality of horn activation switches is connected to each other by a pair of conduits configured to receive the pair of wires.

16. The horn switch assembly as in claim 14, wherein each housing further comprises a lower portion configured to receive a non-conductive lower housing mounting member configured to receive the non-insulated portion of the pair of wires.

17. The horn switch assembly as in claim 14, further comprising: a mass damper movably mounted to the steering wheel armature, wherein the mass damper is mounted within an area defined by the plurality of horn activation switches.

18. The horn switch assembly as in claim 14, wherein the inner flange has an opening configured to allow the conductive horn circuit activation end to pass therethrough and the inner flange prevents the biasing member from contacting the non-insulated portion of the pair of wires.

19. The horn switch assembly as in claim 14, wherein each housing further comprises a datum location feature having an opening configured to slidably receive a datum of the airbag module.

20. A method for securing an inflatable cushion to a steering wheel armature, the method comprising:

disposing a backing plate about the inflatable cushion, the backing plate defining a receiving area, the receiving area being configured to receive at least a portion of the inflatable cushion, the receiving area being defined by a peripheral wall of the backing plate;

providing a plurality of mounting members depending outwardly and away from the peripheral wall, the plurality of mounting members providing a mounting surface, wherein the mounting surface of the plurality of mounting members is configured to receive a mounting mechanism therein, wherein each of the plurality of mounting members further comprises a contact point secured thereto;

securing a plurality of non-conductive isolation mechanisms to the steering wheel armature, wherein at least one of the plurality of isolation mechanisms comprises a guide pin and a locking pin for guiding and movably securing one of the mounting mechanisms thereto and each of the plurality of isolation mechanisms comprises a pair of wires each having a non-insulated portion disposed proximate to the contact point of one of the plurality of mounting members; and locating a biasing member between each of the plurality of isolation mechanisms and a respective one of the plurality of mounting members, wherein the backing plate is capable of movement between a first position and a second position, wherein the contact point of one of the plurality of mounting members makes contact with the non-insulated portion of the pair of wires in the second position providing a conductive path therebetween.

* * * * *